(12) United States Patent  
Simske et al.

(10) Patent No.: US 8,055,713 B2
(45) Date of Patent: Nov. 8, 2011

(54) EMAIL APPLICATION WITH USER VOICE INTERFACE

(75) Inventors: Steven J. Simske, Fort Collins, CO (US); R. John Burns, Barcelona (ES); Xiaofan Lin, San Jose, CA (US); Sherif Yacoub, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 2799 days.

(21) Appl. No.: 10/715,179

(22) Filed: Nov. 17, 2003

(65) Prior Publication Data

US 2005/0108338 A1    May 19, 2005

(51) Int. Cl.
*G06F 15/16* (2006.01)
(52) U.S. Cl. ........ 709/206; 709/207; 709/220; 455/566; 370/352

(58) Field of Classification Search .......... 709/206, 709/207, 220, 227, 225, 224, 228; 370/352; 455/566; 379/88.17
See application file for complete search history.

(56) References Cited

U.S. PATENT DOCUMENTS

| 5,905,863 | A    |   | 5/1999 | Knowles et al. |         |
|-----------|------|---|--------|----------------|---------|
| 6,404,762 | B1   | * | 6/2002 | Luzeski et al. | 370/352 |
| 6,529,804 | B1   |   | 3/2003 | Draggon et al. |         |
| 6,907,112 | B1   | * | 6/2005 | Guedalia et al.| 379/88.17 |
| 7,209,955 | B1   | * | 4/2007 | Major et al.   | 709/207 |
| 2002/0087620 | A1 | * | 7/2002 | Rouse et al.  | 709/203 |

* cited by examiner

*Primary Examiner* — Khanh Dinh

(57) ABSTRACT

In at least some embodiments, a system may comprise a user voice interface, a processor coupled to the user voice interface, wherein the processor interprets words spoken by a user, and a memory coupled to the processor, wherein the memory stores an email application, wherein the email application summarizes email messages and navigates a plurality of email messages according to the words spoken by the user.

27 Claims, 3 Drawing Sheets

EMAIL APPLICATION WITH USER VOICE INTERFACE

BACKGROUND

Electronic mail (email) services permit users to send text and electronic files to others using a network of computers. Reading through and responding to emails may require a substantial amount of time. Therefore, methods and systems that improve efficiency of email use are desirable.

SUMMARY

In at least some embodiments, a system may comprise a user voice interface, a processor coupled to the user voice interface, wherein the processor interprets words spoken by a user, and a memory coupled to the processor. The memory stores an email application, wherein the email application summarizes email messages and navigates a plurality of email messages according to the words spoken by the user.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure, including the claims, is limited to that embodiment.

The embodiments disclosed herein help achieve efficient email browsing. Examples of various embodiments may include voice-driven interaction between an email application and a user, automatic speech recognition (ASR), text-to-speech (TTS) technology, and text summarization techniques. Embodiments of the invention may use these and other technologies to navigate text-based and attachment-based electronic data (e.g., email with attachments) using voice commands. Additionally, a user may reply to emails by dictating a text response, a subject header, recipients, and new and/or altered attachments. Embodiments of the invention may provide an effective mechanism to navigate, browse, access, and send email messages via a voice user interface. In at least some embodiments, summarization techniques, keyword extraction, and/or word spotting may be used to browse email messages and/or attachments.

Figure 1:
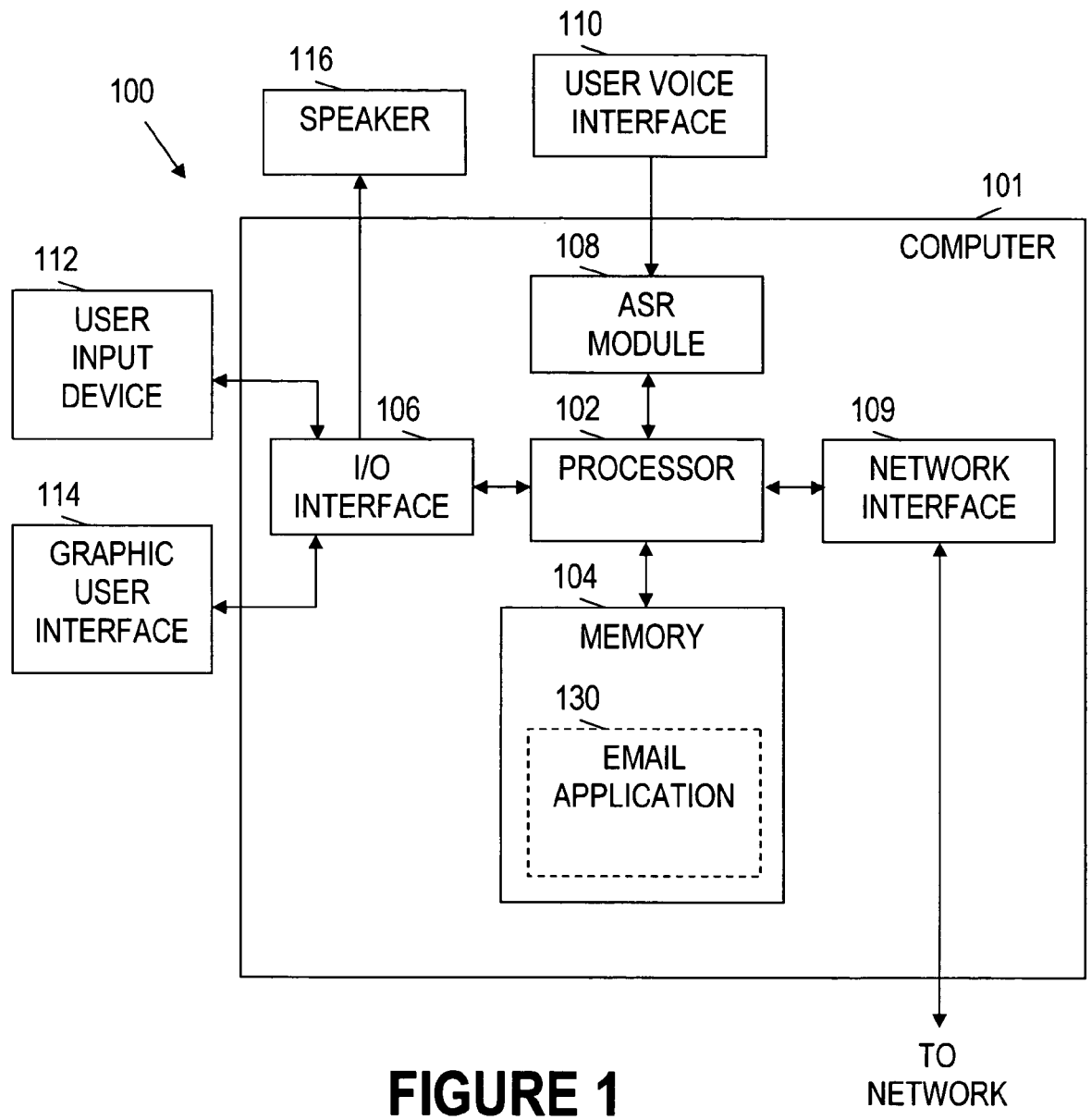
FIG. 1 illustrates a block diagram of a system in accordance with embodiments of the invention.

FIG. 1 illustrates a block diagram of a system 100 in accordance with embodiments of the invention. As shown in FIG. 1, the system may comprise a user voice interface 110 coupled to an automatic speech recognition (ASR) module 108 of a computer 101. Further, the computer 101 may couple to a graphic user interface 114, a user input device 112, and a speaker 116. The computer 101 also may comprise a processor 102 coupled to the ASR module 108, a memory 104, an input/output (I/O) interface 106, and a network interface 109. The graphic user interface 114, the user input device 112, and the speaker 116 may couple to the computer 101 via the I/O interface 106 as shown. The network interface 109 may couple to a network.

In at least some embodiments, the user voice interface 110 may be implemented as a telephone, cell phone, or microphone. The user input device 112 may comprise a keyboard, keypad, and/or mouse. The graphic user interface 114 may comprise a cathode ray tube (CRT) monitor, liquid crystal display (LCD) screen, or other graphic interface. The ASR module 108 may receive data representative of a user voice (e.g., voice commands) from the user voice interface 110 and may digitize the voice data. The ASR module use speech recognition techniques to recognize or otherwise interpret words and/or commands. These words and/or commands may be used by the email application 130 stored in memory 104 to navigate, browse, access, create, and send email messages as will be described later. In some embodiments, the user voice interface 110, the computer 101, the input device 112, the graphic interface 114, and the speaker 116 may be implemented as a network-enabled cell phone. In some embodiments, the ASR module 108 may be implemented in a network (not shown). Therefore, the speech recognition process may be performed by the computer 101 or by processes of a network. In some embodiments, the user voice interface 110 may couple wirelessly to the network.

The ASR module 108 may function with the processor 104 and instructions stored in the system memory 106 to recognize voice data and process the data for use by the email application 130. In some embodiments, the email application 130 may function with the computer 101 to display graphics on the graphic user interface 114 that permit the user to visually interact with the email application 130. For example, a user may view any text or graphics related to navigating, browsing, accessing, creating, deleting, and sending email messages including attachments. In some embodiments, the email application 130 may function with computer 101 to interact with the user using audio signals. For example, the user may hear words corresponding to text contained in emails and/or attachments using the speaker 116. Additionally or alternatively, options provided by the email application 130 may be provided to the user through the speaker 116. These options may comprise any user controllable options related to navigating, browsing, accessing, creating, deleting, and sending email messages and attachments.

Figure 2:
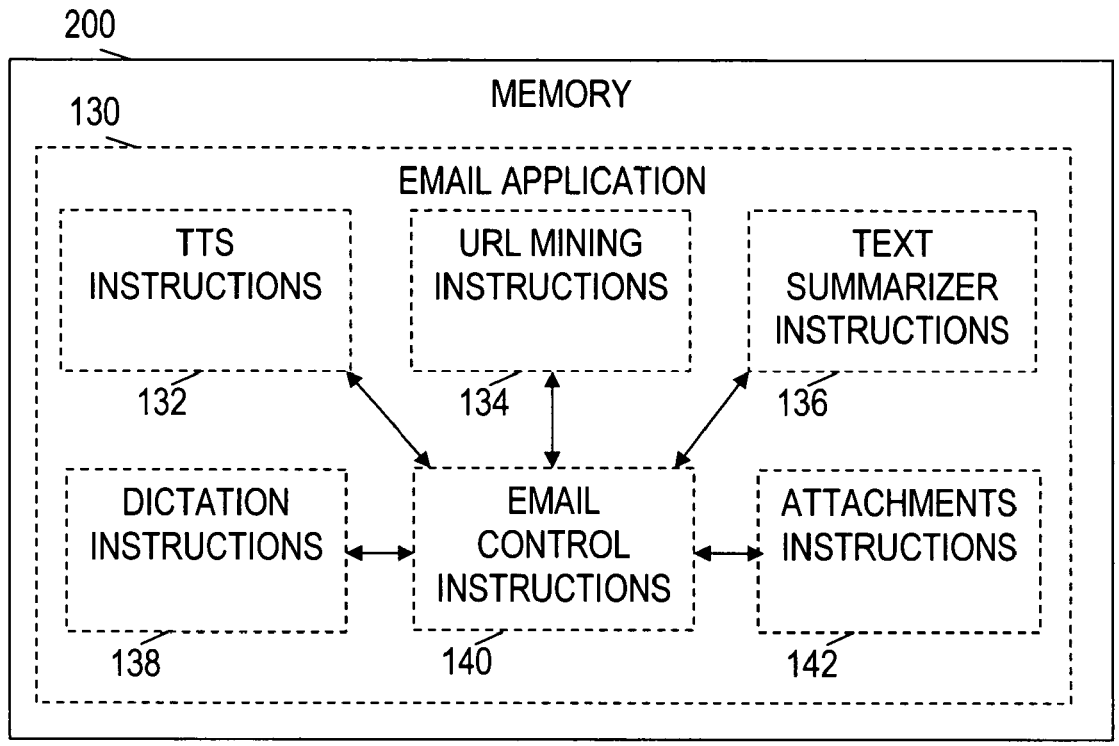
FIG. 2 illustrates a block diagram of an email application used in the system of FIG. 1.

FIG. 2 illustrates an email application 130 in accordance with embodiments of the invention. In accordance with at least some embodiments, the email application may be stored in a memory 200. The email application 130 may be implemented in a computer 101 as shown for FIG. 1. Alternatively, the email application 130 may be implemented in a network (e.g., a server). As will be described later, the email application 130 may interact with a network such that the content of an email and/or email attachment may be related to information available on the network (e.g., the Internet, a company Intranet, and/or other local network). Therefore, implementing the email application 130 in a network may improve the performance of the email application 130 when used with the available network services.

As shown in FIG. 2, the email application 130 may comprise email control instructions 140, text-to-speech (TTS) instructions 132, uniform resource locator (URL) mining instructions 134, text summarizer instructions 136, dictation instructions 138, and attachments instructions 142. The TTS instructions 132 of the email application 130 may be used to convert text to speech. For example, the TTS instructions 132 may permit a user to listen to email messages and/or email attachments via the speaker 116. The URL mining instructions 134 may be used to search for information (e.g., text) located at web pages identified by URLs. For example, an email user may want to include information available on the Internet in an email. Accordingly, the URL mining instructions 134 may be used to search for information according to input from the user and/or content of an email. In some embodiments, the URL mining instructions 134 may function with web services that gather information.

The text summarizer instructions 136 may be used to summarize emails, attachments, and/or Internet pages. In some embodiments, the text summarizer instructions 136 may summarize the content of email, email attachments, and/or Internet pages to a single word, sentence, paragraph, or group of sentences. The text summarizer instructions 136 may also "scan" the content of email, email attachments, and Internet content and link related text together. Therefore, in at least some embodiments, a user, while reading or listening to the text of an email, may skip to related words, sentences, and/or paragraphs found in the same email or other emails, email attachments, and Internet pages. For more information regarding summarization and text linking techniques, reference may be made to commonly owned U.S. patent application Ser. No. 10/338,584, entitled "Methods and Systems for Organizing Electronic Documents," and filed on Jan. 7, 2003, incorporated herein by reference.

The dictation instructions 138 may permit an email user to dictate a text or audio email message and/or attachment. In some embodiments, the dictation instructions 138 may interact with the ASR module 108 and the TTS instructions 132 to provide automatic speech recognition with text-to-speech feedback, whereby a user may listen to a dictated message before or after that email message has been sent. The attachments instructions 142 may permit a user to add and/or edit an attachment to an email. In some embodiments, the attachments may be added and/or edited as specific file types (e.g., PDF, DOC, HTML).

The email control instructions 140 may coordinate the interaction of a user with the email application 130 by managing the use of the TTS instructions 132, the URL mining instructions 134, the text summarizer instructions 136, the dictation instructions 138, and the attachments instructions 142. In some embodiments, the email control instructions 140 may permit an email user to dynamically navigate, browse, access, create, delete, and send email messages and/or attachments via voice commands. For example, the email control instructions 140 and the ASR module 108 may function to recognize a plurality of pre-determined commands. In some embodiments, the pre-determined commands may be preset. In some embodiments, command phrases may be customized for a particular user. For example, the email application 130 may permit the user to record/say phrases such as "next email," "previous email," "go to next related email" or other phrases. The email user may assign these phrases to particular functions of the email application 130. In some embodiments, the user may customize command phrases and other options provided by the email application 130 using voice interaction, typing interaction, or completing an electronic form. Thus, when the email user says a phrase that has been assigned to an email application function, the email application 130 may perform that function.

The email control instructions 140 also may manage interrupts that may occur during the use of the email application 130. For example, the email control instructions 140 may manage the initialization and/or termination of the various functions of the email application 130 according to user commands. Additionally, the email control instructions may manage, "skipping" or jumping between related emails and/or attachments according to commands from the user.

Figure 3:
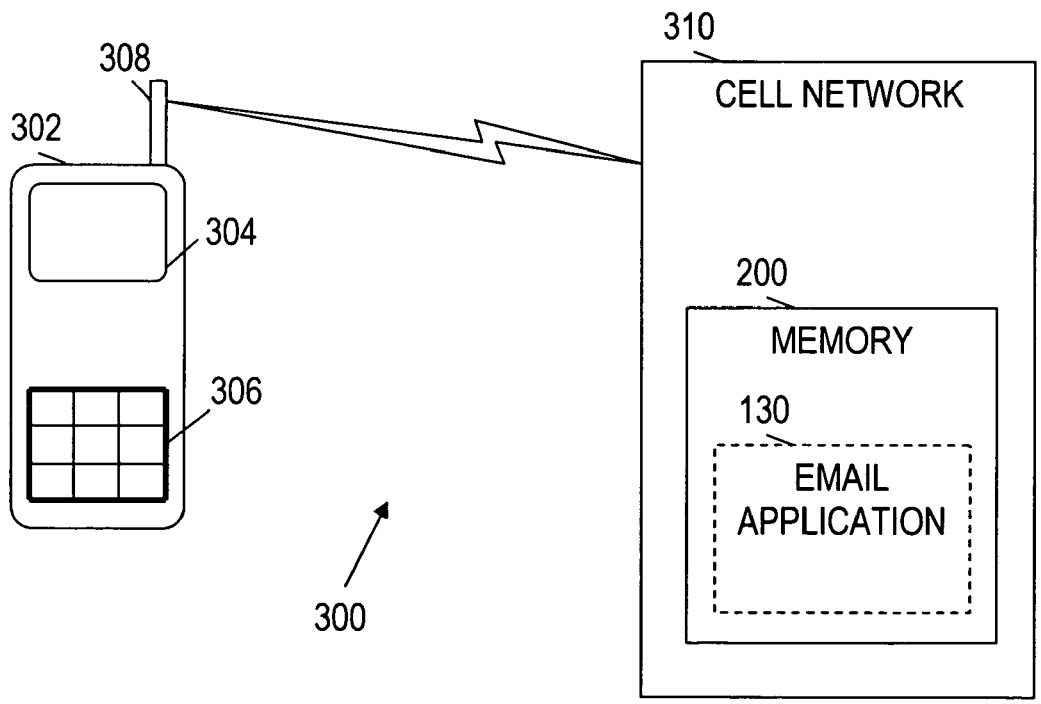
FIG. 3 illustrates a block diagram of a system in accordance with an alternative embodiment of the invention.

FIG. 3 illustrates a block diagram of another system 300 in accordance with embodiments of the invention. As shown in FIG. 3, the system 300 may comprise a cell phone 302, or other remote communication device, that couples wirelessly to a cell network 310. The cell phone may comprise a graphics user interface 304, a keypad 306, and an antenna 308. Additionally, the cell phone 302 may comprise other components (not shown) such as those illustrated in FIG. 1. The cell network 310 may comprise a memory 200 and an email application 130 such as those illustrated above for FIG. 2. In some embodiments, the cell phone 302 may navigate, browse, access, create, delete, and send email messages and attachments by accessing the email application 130 of the cell network 310. Additionally, the cell phone 302 may access voice mail stored at the cell network 310. In some embodiments, voice mail may be included with the email application 130 so that a user may simultaneously access both voice mails and emails using the cell phone 302.

Figure 4:
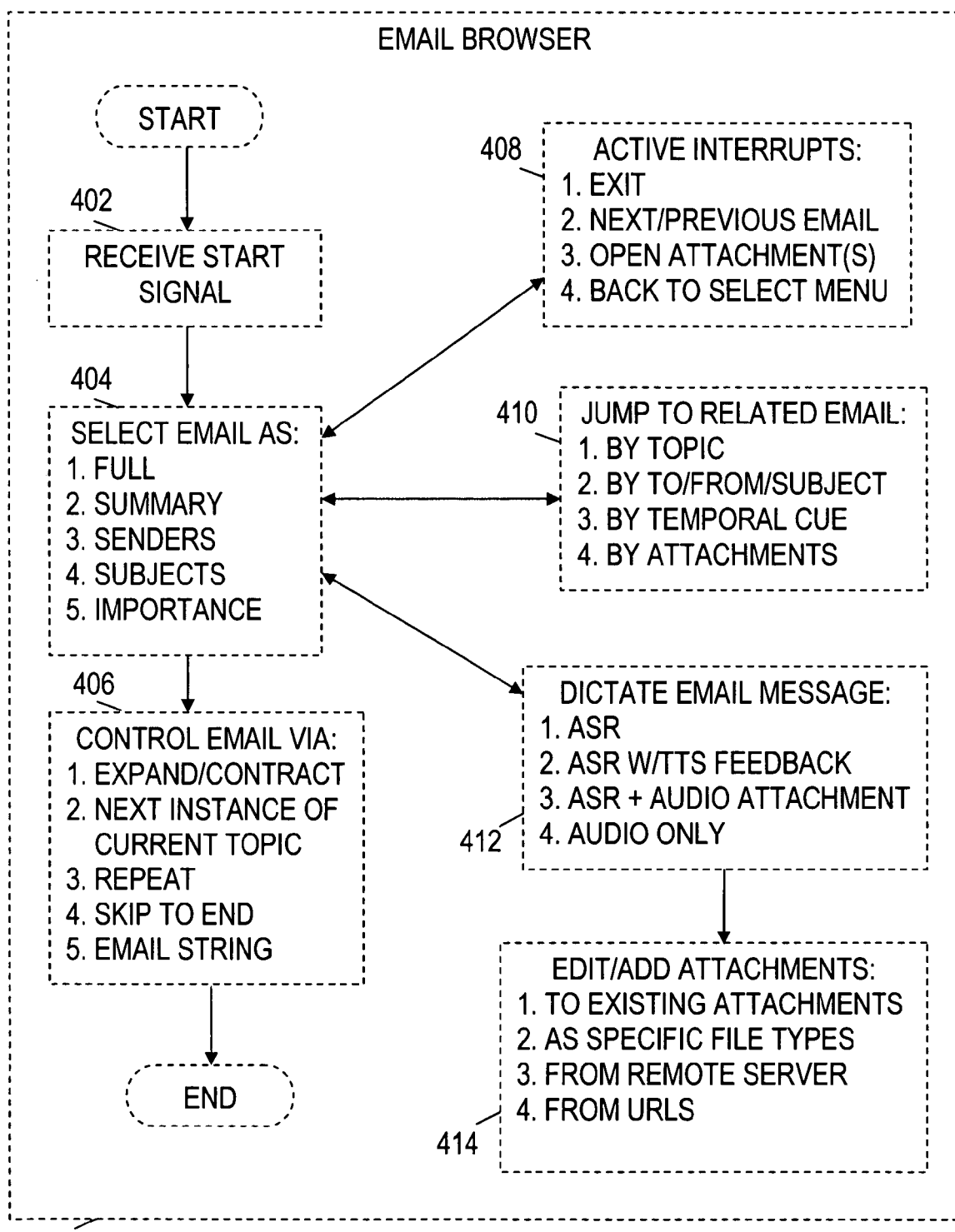
FIG. 4 illustrates a block diagram of the email application.

FIG. 4 illustrates a block diagram of an email browser 130 functioning in accordance with embodiments of the invention. As shown in FIG. 4, the email application 130 may receive a start signal at block 402. For example, the start signal may comprise a call from a cell phone or another signal from the user voice interface 110. In some embodiments, voice over Internet Protocol (VoIP) may be used. Once the email application 130 is activated, a user may select a method for sequencing through email messages at block 404. As shown in FIG. 4, some mechanisms (i.e., modes) for sequencing through emails may include: 1) entire email mode ("full"); 2) email summaries mode ("summary"); 3) email senders mode ("senders"); 4) email subjects mode ("subjects"); and important emails mode ("importance"). Attachments also may be used for sequencing between emails. In at least some embodiments the user may toggle between these modes using a voice command. For example, voice commands for the sequencing modes 1-5 described above may be "email entire," "email summary," "email senders," "email subjects," and "important emails," respectively.

The entire email mode may display, visually or audibly, the entire contents of each email. The email senders mode may analyze and/or decode the "sender field" of a number of email messages and display, visually or audibly, the senders of those email messages. The email subjects mode may analyze and/or decode the "subject field" of a number of email messages and display, visually or audibly, the subjects of the email messages.

The email summaries mode may weight keywords, sentences, and/or paragraphs of emails and email attachments. In particular, a summary of an email may be obtained by weighting the sentences of an electronic email or attached file and creating a summary containing a number of the most highly weighted sentences. The summary sentences may be presented to the email user in order of priority as reflected by the respective sentence weights. In some embodiments, information obtained from the subject field of an email may be used as a set of keywords to pick the most important sentences in the email and/or email attachment. For more information regarding methods of summarizing electronic documents, reference may be made to previously referenced U.S. patent application Ser. No. 10/338,584, entitled "Methods and Systems for Organizing Electronic Documents." As previously explained, the keywords, sentences, and/or paragraphs of an email message and/or attachments may be electronically linked to other related keywords, sentences, and paragraphs found in the same email (including attachments) or other emails and their corresponding attachments. In some embodiments, the summarization and linking techniques may be performed "off-line" (i.e., as email arrives, not when the user calls).

The important emails mode may display, visually or audibly, the content of emails determined to be important, as described below. In the important email mode, the user may be presented with the most important email messages before other emails are presented. Alternatively, the important email mode may present only those emails that are considered important. This mode may be valuable when the user has received a large number of messages and wants to hear only the most important messages. In particular, some users may access the email application 130 using only a cell phone, or another remote communication device, and do not have access to a graphic user interface 114 capable of efficiently displaying email text. Typically, listening to email may be slower than reading email. Therefore, a valuable feature of the email application 130 may be the ability to permit a user to access only those emails considered the most important by phone (e.g., when a user does not have access to the Internet). Additionally, the user may conveniently access voice mail using the same phone or cell phone.

A number of factors may be used to determine the importance of an email. For example, some email systems allow a sender to mark a message as "urgent" or "important." Therefore, messages marked as such may be considered as important. Additionally or alternatively, a user may specify rules that define messages from a particular sender or containing certain words to be important. In some embodiments, a user may label received email messages as important. Accordingly, such embodiments may automatically compare incoming messages to those labeled messages. If the incoming message is similar to a previously received important message, then the incoming message will be marked as important. The similarity between messages may be measured using weighted words, sentences, and/or paragraphs. Such techniques are described in the previously referenced and incorporated U.S. patent application Ser. No. 10/338,584, entitled "Methods and Systems for Organizing Electronic Documents."

At block 406, a user may control email content presented to the user via voice commands. As shown in FIG. 4, a user may employ a variety of commands such as, "expand," "contract," "next instance of current topic," "repeat," "skip to end," and "email string" to control the email content. While these commands may be used in some embodiments, these commands are exemplary, and do not limit embodiments of the invention. For example, the "expand" and "contract" commands may permit a user to view and/or hear more or less of the content of an email message. If a user is listening to a sentence of an email using the email summary mode, that user may use the command "expand" to "pop out" from the summary sentence to the paragraph from which the summary sentence came from. More specifically, if the user hears the summary sentence "If you don't do this, you're fired!" that user may wish to say "expand!" to hear the whole paragraph: "I was talking to my boss about the A project. He said that A asked us to deliver on articles 13 and 15 by May. My boss was adamant and said, 'If you don't do this, you're fired!'" Alternatively, if the user is listening to an email in the entire email mode, that user may use the commands "contract email" or "contract paragraph" to hear only the most important sentence(s) of the email or email paragraph.

The "next instance of current topic" command may be useful when a user is only interested in one topic, or item, of an email. For example, in a long email describing the action to be taken by each member of a business team, a user may wish to hear about items that are directed to him. If the user's name is Bob, the user may say, for example, "next word Bob" to skip to the next sentence in the email that contains the word Bob.

The "repeat" command may be used to repeat an entire email, an email summary, a paragraph, or a sentence. Some examples of the repeat command may be "repeat email" or "repeat sentence." The "skip to end" command may be used to skip to the end of an email. For example, if a user is no longer interested in an email, the user may say "skip to end" to transition to the next email. The "email string" command may be used when a user wants to review email messages that form part of a string of email responses ("replies"). While hearing an email, the user may say the command "email string" followed by either of the commands "previous" or "next" to navigate through email strings. For example, if the user speaks the command "previous," the user may hear the previous email in the email string. If the user speaks the word "next," the user may hear the next email in the email string.

At block 408, the email application 130 provides interrupts that may be used by a user while using the email application 130. As shown in FIG. 2, some examples of interrupt voice commands may include: 1) "exit"; 2) "next email" or "previous email"; 3) "open attachment"; and 4) "back to select menu." The "exit" command may be used to shut down, exit, or otherwise end, the email application 130. The "next email" command may be used to interrupt the presentation of the current email so that the user may hear the next available email. The "previous email" command may be used to interrupt the presentation of the current email so that the user may hear the previous email. In at least some embodiments, the "next email" and "previous email" commands may be used without changing the manner in which emails are reported (e.g., entire email mode or email summary mode). The "open attachment" command may be used to open and access one or more electronic files attached to an email message. In some embodiments, the user may be informed visually or audibly that an email includes one or more attachments. Additionally, the user may also use a command such as "check the attachment for viruses" before opening an attachment, whereby the email application 130 may scan an email attachment for viruses. The "back to select menu" command may be used to change the manner in which emails are presented or sequenced as described above, for example, at block 404.

In some embodiments, the email application 130 may be used together with "voice-based web navigation." With voice-based web navigation, the user may "jump to" or access the Internet or a local network. For example, a user may hear the sentence, "I'd like you to send the PPG to the RTH." If the user does not know what the acronym "RTH" means, that user may give a command such as "context RTH" to have a browser search the user's files, the company Intranet, and/or the Internet to find the definition for RTH. The email application 130 then may display the definition for RTH, visually or audibly, to the user. For more information regarding voice-based web navigation, reference may be made to U.S. Pat. No. 6,523,061 entitled, "System, method, and article of manufacture for agent-based navigation in a speech-based data navigation system" and U.S. Pat. No. 6,513,063 entitled, "Accessing network-based electronic information through scripted online interfaces using spoken input," both of which are incorporated herein by reference.

At block 410, the email application 130 may allow a user to access or "jump to" related email. As shown in FIG. 2, a user may jump to related email by: 1) topic; 2) the TO, FROM, and/or SUBJECT fields of emails; 3) temporal cue (i.e., before or after a specified date and time, or between a specified time and/or date); and 4) by attachments. As an example, consider a user that hears the phrase, "I'd like you to take care of the action items on the Renovator" while listening to an email message. If the user says "Renovator" after hearing the above phrase, the email application 130 may respond by asking "Jump to the next mention of Renovator in this email?" or "Jump to related email attachments that mention Renovator?". Accordingly, the user may use voice commands to interact with the email browser to navigate through emails and email attachments.

At block 412, the email application 130 may permit a user to dictate an email message. As shown in FIG. 2, the user may dictate an email message using 1) ASR; 2) ASR with text-to-speech (TTS) feedback; 3) ASR and an audio attachment; and 4) audio only. Using ASR, the user may dictate the fields (e.g., the TO, FROM, and SUBJECT fields) and body of an email message. In some embodiments, the user may speak the command "create email," after which the email application 130 may provide audible prompts to fill in the TO/FROM/SUBJECT fields, the email message, and any attachments. For example, to fill in the "TO" field, the email application 130 may interact with the user by presenting prompts such as "Who is the recipient?" or "To whom?" after which the user may speak the name, nickname, and/or email address of the recipient(s). Alternatively, the user may speak commands such as "TO field" or "Edit TO field" after which the user may speak the name, nickname, and/or email address of the recipient(s). Similar interaction between the user and the email application 130 may be implemented to fill in the other fields, the email message, and attachments.

If the user would like to hear the words that the email browser 130 has recognized, the TTS feedback may be used at any point during dictation of the email or after the entire email has been dictated. Additionally, a user may wish to attach an audio version of a dictated message as a "backup" (in case the ASR engine does not translate correctly). In some embodiments, the email browser 130 may automatically decide whether to use the dictated text message or the audio message. For example, the email browser 130 may calculate a "confidence score" for the dictated message. If the confidence score is below a pre-determined threshold, only the audio message may be sent to a recipient. Alternatively, if the confidence score is above the pre-determined threshold the text may be sent to the recipient. Some examples of voice commands that may be used at block 412 include "dictate with ASR," "dictate with ASR plus TTS," "dictate with ASR plus audio," "dictate audio." Alternatively, the dictation choices described above may be accessed using simplified command dialog such as "dictate option 1," "dictate option 2," "dictate option 3," and "dictate option 4." In some embodiments, submenus may be used, for example, "ASR," followed by "audio."

At block 414, the email browser 130 may permit the user to add and/or edit attachments via voice commands. As shown in FIG. 2, some embodiments may permit a user to add and/or edit attachments: 1) to existing attachments; 2) as specific file types; 3) from remote servers; and 4) from URLs. When editing an attachment, the email browser 130 may use techniques similar to text editing programs, whereby changes to text may be tracked (e.g., "track changes" in Microsoft Word® or "TouchUp Text" in Adobe Acrobat®). For example, these changes may be controlled using commands such as "add" or "delete" followed by the words and/or location of the words that the user wishes to add or delete. Some methods of annotation that may be used to edit attachments include text-based annotation and files (e.g., .TXT extensions) or Extensible Markup Language (XML)-based annotations (e.g., for a file "ThisFile.pdf" a user may add the file "ThisFileAppended.XML" as an attachment for the email reply). Additionally, or alternatively, "meta-data" (i.e., data that describes the content, quality, and/or other characteristics of email attachments) may be added to the headers of the attachments and/or annotated files.

In some embodiments, attachments may be added from a remote server. In some embodiments, the user may ask for URLs and/or Internet/network-based files using voice-based web navigation techniques such as those previously mentioned. While any file type may be editable using the email application 130, some embodiments may permit .XML and .TXT type attachments only for design simplification.

The above discussion is meant to be illustrative of the principles and various embodiments of the present invention. Numerous variations and modifications will become apparent to those skilled in the art once the above disclosure is fully appreciated. For example, "spam" email detection, and various system settings of the email application 130, such as categorizing email as "read" or "unread" may be taken into account. Additionally, some ASR implementations may use "training" (i.e., an ASR application may store a set of speech-based sounds for each user) to optimize speech recognition for a particular user. It is intended that the following claims be interpreted to embrace all such variations and modifications.

What is claimed is:

1. A system, comprising:
a user voice interface;
a processor coupled to the user voice interface, wherein the processor interprets words spoken by a user through the user voice interface;
and
a memory coupled to the processor, wherein the memory stores an email application executed by the processor, wherein the email application summarizes email messages and navigates a plurality of email messages according to the words spoken by the user,
wherein the email application weights words of a text to generate summaries of emails and email attachments.

2. The system of claim 1, wherein the email application accesses information on a network related to a word spoken by the user and displays the information to the user.

3. The system of claim 1 wherein the email application provides content-based re-direction between at least two items selected from the group consisting of emails and email attachments.

4. The system of claim 1 wherein the user voice interface is selected from the group consisting of a cell phone, a telephone, and a microphone.

5. The system of claim 1 further comprising a speaker coupled to the processor, wherein the speaker audibly communicates options provided by the email application to the user.

6. The system of claim 5 wherein the speaker further allows written content of emails and email attachments to be communicated audibly to a user of the email application.

7. The system of claim 1 wherein the email application controls email content presented to a user according to at least one voice-controlled function selected from a group consisting of expanding a summary sentence to a surrounding paragraph, contracting an email paragraph to a summary sentence, contracting an email to a summary, accessing a next instance of a topic in an email, accessing a next instance of a topic in an email attachment, repeating a sentence of an email, repeating a paragraph of an email, repeating an email, skipping to the end of an email, and accessing emails within an email string.

8. The system of claim 1 wherein the email application allows a user to dictate words for a voice-activated function selected from a group consisting of creating an email message, editing an email attachment, filling in fields of an email, and creating an audio version of an email.

9. The system of claim 1 wherein the email application permit a user via voice commands to perform a function selected from a group consisting of adding an attachment to an existing attachment, editing an existing attachment, adding an attachment from a remote server, adding a URL-based attachment, and adding meta-data to a header of an attachment.

10. A method, comprising:
receiving voice commands;
selecting a mode for sequencing through a plurality of emails according to a voice command;
presenting content of a select email to a user according to a voice command;
accessing an email containing text related to the presented email according to a voice command; and
activating an interrupt while presenting content of the selected email according to a voice command, wherein the interrupt causes an action selected from a group consisting of: exiting an email browser;
going to a next email;
going to a previous email;
opening an attachment; and
returning to an email sequencing mode select menu.

11. The method of claim 10 further comprising accessing an email attachment related to the presented content of the selected email according to a voice command.

12. The method of claim 10 wherein the mode for sequencing through a plurality of emails is selected from a group consisting of an entire email mode, an email summary mode, an email subject mode, an email sender mode, and an important emails mode.

13. The method of claim 10 further comprising dictating an email message according to a voice command.

14. The method of claim 10 further comprising adding an email attachment according to a voice command.

15. The method of claim 10 further comprising editing an email attachment according to a voice command.

16. The method of claim 10 wherein further comprising searching for information on a network related to text of an email using a voice command.

17. A computer readable non-transitory medium containing instructions that are executable by a computer system, and when executed the instructions implement a method comprising:
selecting a mode for sequencing a plurality of emails according to a voice command of a user;
dynamically changing content presentation of a select email according to a voice command of the user; and
accessing an email containing text related to the select email according to a voice command of a user.

18. The computer readable non-transitory medium of claim 17 wherein executing the instructions implement a method further comprising summarizing emails and email attachments presentable to the user.

19. The computer readable non-transitory medium of claim 17 wherein executing the instructions implement a method further comprising:
using voice-based web navigation techniques to perform a search for information related to content of the select email; and
audibly presenting results of said search to the user.

20. The computer readable non-transitory medium of claim 17 wherein executing the instructions implement a method further comprising dictating words of an email according to a voice-activated function selected from a group consisting of automatic speech recognition, automatic speech recognition with text-to-speech feedback, automatic speech recognition plus an audio attachment, and audio only.

21. The computer readable non-transitory medium of claim 17 wherein executing the instructions implement a method further comprising performing a voice-activated function selected from a group consisting of adding an attachment to an existing attachment, editing an existing attachment, adding an attachment from a remote server, adding a URL-based attachment, and adding meta-data to a header of an attachment.

22. The computer readable non-transitory medium of claim 17 wherein executing the instructions implement a method further comprising managing interrupts while an email is being presented, wherein the interrupts are selected from a group consisting of exiting the email application, accessing a next email, accessing a previous email, opening an attachment, returning to an email sequencing menu, accessing another email that contains similar content, and accessing an email attachment that contains similar content.

23. The computer readable non-transitory medium of claim 17 wherein executing the instructions implement a method further comprising managing access to related email, wherein the emails are related by at least one item selected from a group consisting of topic, TO field, FROM field, SUBJECT field, temporal cue, and attachments.

24. A system, comprising:
a processor;
a memory coupled to the processor;
means for interpreting voice commands of a user received from a remote communication device;
means for changing an email sequencing mode according to a voice command of the user; and
means for dynamically changing email content presented to a user according to a voice command of the user.

25. The system of claim 24 further comprising means for summarizing text of an email.

26. The system of claim 24 further comprising means for accessing information related to text content of an email wherein the information is accessed from a source selected from a group consisting of emails, email attachments, Internet content, and Intranet content.

27. The system of claim 24 wherein the email sequencing mode allows a user to visually or audibly access text selected from a group consisting of entire emails, email summaries, email senders, email subjects, and important emails.

* * * * *